(12) United States Patent
Esselman

(10) Patent No.: US 7,066,994 B2
(45) Date of Patent: Jun. 27, 2006

(54) METHOD AND COMPOSITION FOR INCREASING SLIP RESISTANCE OF A SUBSTRATE SURFACE

(76) Inventor: Scott P. Esselman, 18 Overlook Dr., Denville, NJ (US) 07834

( * ) Notice: Subject to any disclaimer, the term of this patent is extended or adjusted under 35 U.S.C. 154(b) by 0 days.

(21) Appl. No.: 10/865,592

(22) Filed: Jun. 10, 2004

(65) Prior Publication Data

US 2005/0274283 A1 Dec. 15, 2005

(51) Int. Cl.
*C09K 3/14* (2006.01)
(52) U.S. Cl. .................. 106/36; 106/287.11; 106/311; 252/364; 523/149; 523/150
(58) Field of Classification Search ............... 106/36, 106/287.11, 311; 252/364; 524/149, 150
See application file for complete search history.

(56) References Cited

U.S. PATENT DOCUMENTS

| | | | |
|---|---|---|---|
| 3,929,705 A | 12/1975 | Minieri | 260/29.6 |
| 4,020,200 A | 4/1977 | Groszek et al. | 427/416 |
| 4,219,358 A | 8/1980 | Hayashi et al. | 106/1.17 |
| 4,631,207 A | 12/1986 | Price | 427/387 |
| 4,724,004 A | 2/1988 | Saito | 106/287.12 |
| 4,832,748 A | 5/1989 | Tawara et al. | 523/454 |
| 5,073,195 A | 12/1991 | Cuthbert et al. | 106/2 |
| 5,356,466 A | 10/1994 | Lawson | 106/36 |
| 5,421,865 A | 6/1995 | Grulke et al. | 106/2 |
| 5,423,910 A | 6/1995 | Schiller | 106/36 |
| 5,695,551 A | 12/1997 | Buckingham et al. | 106/2 |
| 5,913,969 A | 6/1999 | Howe | 106/2 |
| 5,972,090 A | 10/1999 | Hörth | 106/36 |
| 5,989,328 A | 11/1999 | Stahovic et al. | 106/36 |
| 6,258,156 B1 | 7/2001 | Azzopardi | 106/287 |
| 6,270,884 B1 | 8/2001 | Guhde et al. | 428/323 |
| 6,281,275 B1 | 8/2001 | Sanduja et al. | 524/401 |
| 6,300,379 B1 | 10/2001 | Avery | 516/55 |
| 6,403,163 B1 | 6/2002 | Fisher et al. | 427/387 |
| 6,432,191 B1 | 8/2002 | Schutt | 106/287.13 |
| 6,767,881 B1 * | 7/2004 | Griese et al. | 510/421 |
| 6,835,702 B1 * | 12/2004 | Herdt et al. | 510/219 |
| 2001/0002042 A1 | 5/2001 | Avery | 252/182.11 |
| 2002/0129738 A1 | 9/2002 | Avery | 106/287.1 |

* cited by examiner

*Primary Examiner*—Anthony J. Green
(74) *Attorney, Agent, or Firm*—Ernest D. Buff & Associates, LLC; Ernest D. Buff; Theodore J. Pierson

(57) ABSTRACT

A chemical composition is applied to the surface of a substrate to significantly increase its slip resistance properties. The composition comprises a di-methyl silicone compound, an oxidizing agent, an evaporation modifier, a sequestering agent, a hydrotopic agent, a base, and an organic solvent. Advantageously, the composition is readily applied via spraying or the like. It dries rapidly, causing the substrate to become highly slip-resistant even when wet.

2 Claims, No Drawings

METHOD AND COMPOSITION FOR INCREASING SLIP RESISTANCE OF A SUBSTRATE SURFACE

BACKGROUND OF THE INVENTION

1. Field of the Invention

This invention relates generally to substrate surface modifiers; and more specifically to a chemical composition that when sprayed onto a substrates surface renders that substrate surface slip-resistant even when wet.

2. Description of the Prior Art

A significant number of injuries occur in the work place, in commercial establishments and in the home as a result of slip and fall accidents. Floor surfaces often become slippery when wet or after build up of waxes or cleaning agents. Numerous slip and fall accidents occur in showers and bathtubs, the surfaces of which are prone to become slippery when wet. Even if an article has been fabricated with a non-slip surface, it may still become slippery when wet. In addition, surface deposits of grease, oils, dirt or soap residues accumulate in the pores of non-slip surfaces, significantly decreasing their slip-resistant properties.

Numerous processes have been disclosed, which address the problem of slippery surfaces. One process involves removing the buildup of dirt and grease from slip-resistant surfaces through the use of a solution of phosphoric acid, hydrofluoric acid and a wetting agent. In practice of that process, the surface is continually treated with the phosphoric acid, hydrofluoric acid solution to ensure that the surface remains non-slippery. The process is not readily carried out since hydrofluoric acid and phosphoric acid in high concentrations constitute hazardous chemicals. Another designed to remove surface deposits comprises the steps of applying to the surface a solution consisting of phosphoric acid, bifluoride and a wetting agent. The solution utilized by this process avoids the disadvantage of having to be continuously added to the surface. On the other hand, it is disadvantageous in that it contains phosphoric acid, a hazardous chemical.

Other processes for increasing a surface's slip resistance involve the use of anti-skid mats, which can be placed on top of slippery surfaces. Practice of these processes entail significant disadvantages. Dirt and debris accumulate in the space between the mat and the surface. More importantly, with use of such mats, mold and other microbial growth tend to accumulate at the interface of the mat and the substrate surface.

There remains a need in the art for a method and solution for treating the surface of a substrate to enhance its resistance to slip, whether that surface is wet or dry.

SUMMARY OF THE INVENTION

The present invention provides a chemical composition that can be readily applied to the surface of a substrate. Upon application of the composition to the substrate, the substrate surface becomes slip-resistant even when the surface is wet. In one aspect, the invention comprises a solution containing a mixture of compounds. These compounds are especially adapted to be applied to the surface of a substrate composed of ceramic tile, concrete, terrazzo, marble or other like substrate material having a tendency to become slippery when wet. Generally stated, the composition comprises a di-methyl silicone, an oxidizing agent, an evaporation modifier, a hydrotopic agent, a sequestering agent, a base and an organic solvent. In a preferred embodiment the composition comprises di-methyl [[(3-aminopropyl) silylidyne] tris (oxy)] tris-silicone as the di-methyl silicone, chloramines T as the oxidizing agent, glycol ether as the evaporation modifier, tetrapotassium pyrophosphate as the sequestering agent, phosphate ester as the hydrotopic agent, ammonium hydroxide as the base, isopropanol, and methanol as the organic solvents.

The composition is readily applied to the substrate surface; preferably by spraying or the mixture thereon. Upon application, the mixture forms a clear layer on the substrate surface that feels smooth when the substrate surface is dry. However, when a surface bearing the solution of this invention becomes wet, slip-resistant properties created by application of the mixture are retained. That is to say, the surface, upon being treated with the mixture in accordance with the present invention, becomes highly slip resistant when dry; its slip resistant properties are substantially completely retained, even the surface of the substrate becomes wet.

The chemical composition is easily applied to a substrate surface, which thereafter exhibits significantly enhanced slip-resistance, even when wet. Advantageously, the mixture of the invention does not contain hazardous chemicals. In addition, the chemical composition of the present invention does not etch the surface of the substrate. On the other hand, acidic solutions heretofore used to promote slip-resistant surface properties etch the surfaces of substrates to which they are applied, degrading the appearance and strength thereof. These and other features, aspects and advantages of the present invention will become better understood with reference to the following description and claims.

DETAILED DESCRIPTION OF THE INVENTION

The present invention provides a chemical composition which, when added onto the surface of a substrate surface renders the substrate surface relatively slip-resistant even when wet. The chemical composition comprises a di-methyl silicone, an oxidizing agent, an evaporation modifier, a hydrotopic agent, a sequestering agent, a base and an organic solvent. Within five minutes after contacting the substrate, the composition modifies the substrate surface such that the surface is no longer slippery when it becomes wet. The composition is clear, and upon being applied to the substrate is not discernable thereon.

The organic silicon compound used in the present invention is a di-methyl silicone. The preferred silicon compound is di-methyl [[(3-aminopropyl) silylidyne] tris (oxy)] tris-silicone (di-methyl silicone). Di-methyl silicone has a density of 0.98 gm/ml at 25° C. and is insoluble in water. The concentration of di-methyl [[(3-aminopropyl) silylidyne] tris (oxy)] tris-silicone (di-methyl silicone) ranges from about 5% to about 15% by weight in the chemical composition, with about 7% to about 11% preferred, and about 9.5% being the most preferred.

The chemical composition of the present invention also includes an oxidizing agent As used herein, the term "oxidizing agent" means a substance that oxidizes another substance in an oxidation-reduction reaction while accordingly gaining electrons and reducing its oxidation number. Suitable oxidizing agents include chloramine-T, potassium permanganate, bromamine-T and hydrogen peroxide. In the preferred embodiment, chloramines-T is used. The concentration of chloramines T ranges from about 0.5% to about 5% by weight in the chemical composition, with about 1.5% to about 5% preferred, and about 2.75% being the most preferred.

An "evaporation modifier" is a compound that modifies the rate of evaporation of the liquid phase of the composition. If the rate of evaporation is too high the composition will rapidly harden, not enabling the composition to spread evenly on the substrate surface. If the evaporation is too low the composition will slowly harden, enabling dust and other airborne particles to contaminate the chemical composition as it dries. In addition, a slow evaporation rate may result in the chemical composition forming streaks on the substrate surface. In the preferred embodiment, the evaporation modifier is a glycol ether. Examples of glycol ethers that may be used as evaporation modifiers are diethylene glycol butyl ether, ethylene glycol phenyl ether, propylene glycol phenyl ether and propylene glycol methyl ether. The concentration of the glycol ether ranges from about 2% to about 12% by weight in the chemical composition, with about 4% to about 9% being preferred, and about 7.5% being the most preferred.

A sequestering agent is a chemical whose molecular structure can envelop and hold a certain type of ion in a stable and soluble complex. Divalent cations form stable and soluble complex structures with several types of sequestering agents. When held inside the complex, the ions have a limited ability to react with other ions, clays or polymers. Sequestering agents can comprise ethylenediamine tetraacetic acid (EDTA), tetrasodium pryrophosphate, sodium acid pyrophosphate (SAPP), dibasic Ammonium Citrate, and tetrapotassium pyrophosphate. In the preferred embodiment, the sequestering agent is tetrapotassium pyrophosphate. The concentration of tetrapotassium pyrophosphate in the chemical composition ranges from 7% to 12% by weight with 9% being the most preferred.

Phosphate esters are complex phosphated nonionic surfactants. After phosphorylation, a nonionic surfactant becomes anionic in nature and has increased stability and solubility in alkali systems. Phosphate esters can be used as hydrotropes, wetting agents, solubilizers, foam boosters and detergent additives. The concentration of phosphate ester ranges from 1% to 5% with 3% being the most preferred.

A base is included in the chemical composition to give the composition an alkaline pH. The base can include potassium hydroxide, ammonium hydroxide, and sodium hydroxide. However, weaker bases may also be used. In the preferred embodiment, approximately 6% by weight ammonium hydroxide is included in the chemical composition.

Any organic solvent useful in masonry applications can be used. Typical organic solvents include mineral spirits, alcohols such as isopropanol and various hydrocarbon solvents, such as toluene and xylene. In the preferred embodiment, two organic solvents, isopropanol and methanol, are used in the chemical composition.

In the preferred embodiment, the Shore Grip™ composition consists of the following chemicals and chemical concentrations:

| Ingredient | % by Wt. | Wt. per unit (8 oz) |
|---|---|---|
| Isopropanol | 58 | 4.64 oz |
| Amino Functional Silicone | 9.5 | 0.76 oz |
| Glycol Ether | 7.5 | 0.60 oz |
| Methanol | 3.75 | 0.30 oz |
| Chloramine T | 2.75 | 0.22 oz |
| Tetrapotassium Pyrophosphate | 9 | 0.72 oz |
| Ammonium hydroxide | 6 | 0.48 oz |
| Phosphate Ester | 3 | 0.24 oz |
| Water | 0.5 | 0.4 oz |

While the mixture set forth above constitutes the preferred composition, suitable mixtures can be obtained by varying the amounts of the above-described constituents.

The chemical composition can be added to the substrate surface through a variety of means. The composition may be added by spraying, pouring, dripping, splashing and applying with a rag or similar device. In each instance the chemical composition is applied onto the substrate surface. Preferably, the chemical composition is applied to the substrate surface by aerosolization or pump spraying.

The foregoing chemical composition may be loaded into an aerosol or pump spray dispenser of a type known in the art. In some embodiments, additional ingredients are added to the composition to facilitate aerosol application.

The substrate surface can be ceramic tile, concrete, terrazzo, marble or other like substrate material. The composition can be usefully applied to a wide variety of substrates, including foyers, laundry rooms, kitchens, bath tubs, decks, surfaces adjacent swimming pools, and the like to markedly improve footing on these surfaces.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

A ceramic tile is coated with the preferred chemical composition set forth above using the following procedure:
1. Two ceramic tiles are cleaned to remove dirt and grease from their surfaces.
2. A mixture of a preferred formulation of the composition of the present invention, referred to herein as SHOREGRIP™, was sprayed onto the surface of one of the ceramic tiles.
3. After allowing the surface of the ceramic tile to dry a hand is drawn over the surfaces of the two tiles to determine the roughness of the surface of the tile treated with SHOREGRIP™ and to compare its texture with that of the untreated ceramic tile.
4. The two ceramic tiles are sprayed with water and a hand is drawn over the surfaces of the two tiles to compare the slip-resistance of the wet ceramic tile treated with SHOREGRIP™ to that of the untreated, wet ceramic tile.

When the surface of the dry ceramic tile treated with SHOREGRIP™ is compared to the surface of the dry ceramic tile there is not a noticeable increase in the roughness of the tile treated with SHOREGRIP™. However, after water has been added to the tiles, the slip resistance of the wet ceramic tile that was treated with SHOREGRIP™ is significantly greater than the slip-resistance of the untreated, wet ceramic tile.

EXAMPLE 2

1. A fiberglass bathtub is cleaned to remove dirt and other debris from its surface.
2. A mixture containing the preferred formulation of SHOREGRIP™ was sprayed onto a substrate surface consisting of a portion of the bottom of a bathtub. Another substrate surface consisting of a different portion of the bottom of the bathtub was not treated.
3. After allowing the bottom surface of the bathtub to dry, a hand was drawn over the bathtub surface to determine the roughness of the surface, and a comparison was made between the portion treated with SHOREGRIP™ and the untreated portion.
4. The bottom surface of the fiberglass bathtub is sprayed with water and a hand is drawn over the surface to determine the slip-resistance of the fiberglass bathtub when wet When the portion of the fiberglass bathtub treated with SHOREGRIP™ is compared to the untreated bathtub portion, there is no discernable increase in roughness of the two surfaces. However, after water has been added to the bottom bathtub surface, the slip resistance of the portion treated with SHOREGRIP™ was significantly greater than the slip-resistance of the wet untreated portion of the bathtub.

EXAMPLE 3

1. A marble foyer is cleaned to remove dirt and other debris.
2. A mixture of the preferred formulation of SHOREGRIP™ was sprayed onto one portion of the marble foyer.
3. After allowing the surface of the marble foyer to dry, a hand is drawn over the surface to determine the roughness of the surface. A comparison is made between the surface portion treated with SHOREGRIP™ and the untreated portion.
4. The ceramic tile is sprayed with water and a hand is drawn over its surface to determine the slip-resistance of the ceramic tile when wet.

When the portion of the marble foyer treated with SHOREGRIP™ is compared to the untreated portion, there is no discernable increase in roughness of either portion. However, after water has been added to the marble foyer, the slip resistance of the portion treated with SHOREGRIP™ is significantly greater than the slip-resistance of the wet untreated portion.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:
1. A chemical composition comprising:
  (a) a di-methyl silicone compound having a concentration in the range of about 5% to about 15% by weight;
  (b) an oxidizing agent, being chloramine-T, having a concentration in the range of about 0.5% to about 5% by weight;
  (c) an evaporation modifier, being glycol ether, having a concentration in the range of about 2% to about 12% by weight;
  (d) a sequestering agent, being tetrapotassium pyrophosphate, having a concentration in the range of about 7% to about 12% by weight;
  (e) a hydrotopic agent, being phosphate ester, having a concentration in the range of about 1% to about 5%;
  (f) a base, being ammonium hydroxide, having a concentration of about 6% by weight; and
  (g) an organic solvent, being selected from the group consisting of: isopropanol, methanol, and mixtures thereof.
2. A chemical composition as recited by claim 1, wherein said di-methyl silicone compound is di-methyl [[(3-aminopropyl) silylidyne] tris (oxy)] tris-silicone (di-methyl silicone).

* * * * *